(12) United States Patent
Lin et al.

(10) Patent No.: US 11,579,447 B2
(45) Date of Patent: Feb. 14, 2023

(54) HEAD-UP DISPLAY CAPABLE OF ADJUSTING IMAGING POSITION

(71) Applicants: LITE-ON ELECTRONICS (GUANGZHOU) LIMITED, Guangzhou (CN); LITE-ON TECHNOLOGY CORPORATION, Taipei (TW)

(72) Inventors: Yu-Chih Lin, Taipei (TW); Tzu-Nan Chen, Taipei (TW); Ming-Ping Lai, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 115 days.

(21) Appl. No.: 17/092,083

(22) Filed: Nov. 6, 2020

(65) Prior Publication Data

US 2021/0302732 A1    Sep. 30, 2021

(30) Foreign Application Priority Data

Mar. 25, 2020   (CN) .......................... 202010218285.1

(51) Int. Cl.
*G02B 27/01* (2006.01)
*G02B 27/09* (2006.01)

(52) U.S. Cl.
CPC ..... *G02B 27/0103* (2013.01); *G02B 27/0944* (2013.01)

(58) Field of Classification Search
CPC ............ G02B 27/0103; G02B 27/0101; G02B 27/4205; G02B 27/0093; G02B 27/0944; G02B 2027/0105; G02B 2027/0109; B60R 1/00; B60R 1/04
See application file for complete search history.

(56) References Cited

U.S. PATENT DOCUMENTS

2019/0004411 A1* 1/2019 Ito ...................... G02B 27/0983
2019/0121130 A1   4/2019 Nguyen et al.

FOREIGN PATENT DOCUMENTS

| CN | 108292045 A |   | 7/2018  |         |            |
|----|-------------|---|---------|---------|------------|
| CN | 110554593 A |   | 12/2019 |         |            |
| CN | 112824968 A | * | 5/2021  | ......... | G03B 21/006 |

(Continued)

OTHER PUBLICATIONS

Chinese Office Action corresponding to Application No. 202010218285.1 and dated Dec. 5, 2022, 8 pages.

*Primary Examiner* — Xuemei Zheng
(74) *Attorney, Agent, or Firm* — Innovation Counsel LLP

(57) ABSTRACT

A head-up display capable of adjusting an imaging position is provided. The head-up display includes an image generation module, a reflector, a holographic diffraction optical element and a control unit. The image generation module is configured to display and project an image. The reflector is configured to reflect the image and further project the image on a transparent screen through the reflector. The holographic diffraction optical element is disposed on the transparent screen to reflect the image to a visible range of the user's eyes. The control unit is coupled to the reflector or the transparent screen to adjust the viewing angle of the holographic diffraction optical element having a pre-determined angle with the reflector.

10 Claims, 4 Drawing Sheets

(56) References Cited

FOREIGN PATENT DOCUMENTS

| JP | EP-0344810 A2 | * | 12/1989 | ......... G02B 27/0103 |
| JP | H07205681 A | * | 8/1995 | |
| WO | WO-2021096447 A1 | * | 5/2021 | ......... G02B 27/0018 |

* cited by examiner

HEAD-UP DISPLAY CAPABLE OF ADJUSTING IMAGING POSITION

This application claims the benefit of People's Republic of China application Serial No. 202010218285.1, filed Mar. 25, 2020, the subject matter of which is incorporated herein by reference.

BACKGROUND OF THE INVENTION

Field of the Invention

The invention relates in general to a head-up display, and more particularly to a head-up display capable of adjusting an imaging position.

Description of the Related Art

The head-up display (HUD) is configured to display driving information (such as vehicle speed, fuel level, and navigation information) within a visible range in front of the driver's eyes, such that the driver can concurrently view the images projected from the head-up display and the traffic state in front of the vehicle.

Since the viewing angle of the conventional head-up display cannot be adjusted to fit users of different heights, the drivers will experience more inconvenience and have more safety concerns. Moreover, since the viewing angle at which users of different heights view the projected image differs widely, the image information viewed by those who are too tall or too short will be biased and cannot be combined with the reality to realize augmented reality.

SUMMARY OF THE INVENTION

The invention is directed to a head-up display capable of adjusting an imaging position to fit users of different heights.

According to one embodiment of the present invention, a head-up display capable of adjusting an imaging position is provided. The head-up display includes an image generation module, a reflector, a holographic diffraction optical element and a control unit. The image generation module is configured to display and project an image. The reflector is configured to reflect the image and further project the image on a transparent screen through the reflector. The holographic diffraction optical element is disposed on the transparent screen to reflect the image to a visible range of the user's eyes. The control unit is coupled to the reflector or the transparent screen to adjust a viewing angle of the holographic diffraction optical element having a pre-determined angle with the reflector.

According to another embodiment of the present invention, a head-up display capable of adjusting an imaging position is provided. The head-up display includes an image generation module, a reflective optical element, a holographic diffraction optical element, a control unit and a holographic viewing angle adjustment mechanism. The image generation module is configured to display and project an image. The reflector is configured to reflect the image and further project the image on a transparent screen through the reflector. The holographic diffraction optical element is disposed on the transparent screen to reflect the image to the visible range of a user. The control unit is coupled to the reflective optical element to adjust a viewing angle of the holographic diffraction optical element having a pre-determined angle with the reflector. The holographic viewing angle adjustment mechanism is electrically connected to the reflective optical element and the control unit. The holographic viewing angle adjustment mechanism is driven by the control unit to reflect the incident light from the reflective optical element to the holographic diffraction optical element.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements. Directional terms such as above, under, left, right, front or back are used in the following embodiments to indicate the directions of the accompanying drawings, not for limiting the present invention.

According to an embodiment of the present invention, a head-up display capable of adjusting an imaging position to fit users of different heights is provided. The viewing angle of the holographic diffraction optical element of the head-up display capable of adjusting an imaging position is designed according to the characteristics of holographic grating and the principles of adjustable viewing angle, and the optical axis angle of the incident light can be changed by a holographic viewing angle adjustment mechanism.

In an embodiment, the image generation module (such as liquid crystal display) can generate a virtual image using the holographic diffraction optical element to assure that the user can view the virtual image at a viewing angle. Since the angle at which users of different heights view the virtual image differs widely, the image information (that is, the imaging position of the virtual image) viewed by those who are too tall or too short will be biased. Furthermore, given that the holographic viewing angle of the holographic diffraction optical element is limited, once the user's viewing angle is greater than the holographic viewing angle, the user will not be able to view the virtual image. That is, when the user changes his/her sitting posture or change a new driver have different heights, the head-up display must adjust the viewing angle of the holographic diffraction optical element using the holographic viewing angle adjustment mechanism to synchronically change the viewing angle to assure that users of different heights can clearly view the virtual image.

In an embodiment, when the head-up display capable of adjusting an imaging position re-constructs the image, the holographic diffraction optical element reflects and diffracts the incident light of specific wavelength (that is, the fluorescent wavelength of the image), but allows the ambient light of other wavelength to completely penetrate the holographic diffraction optical element, such that the driver can concurrently view the image projected by the image generation module and the traffic state in front of the vehicle to realize augmented reality.

Figure 1:
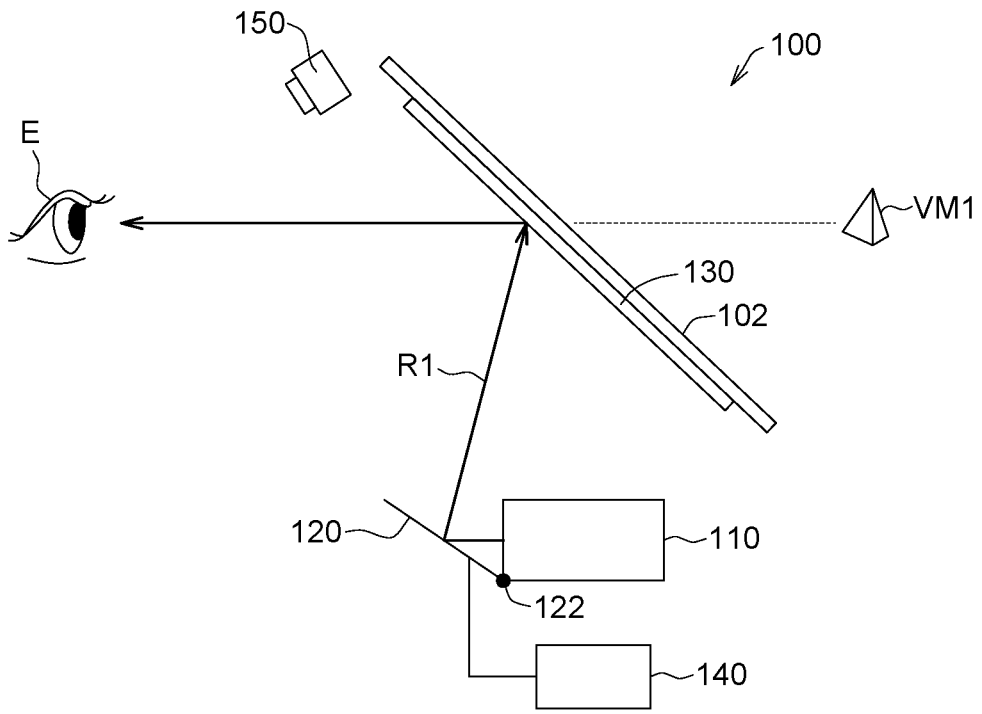
FIG. 1 is a schematic diagram of a head-up display capable of adjusting an imaging position according to a first embodiment of the present invention, wherein the reflector is located at the first position.
Figure 2:
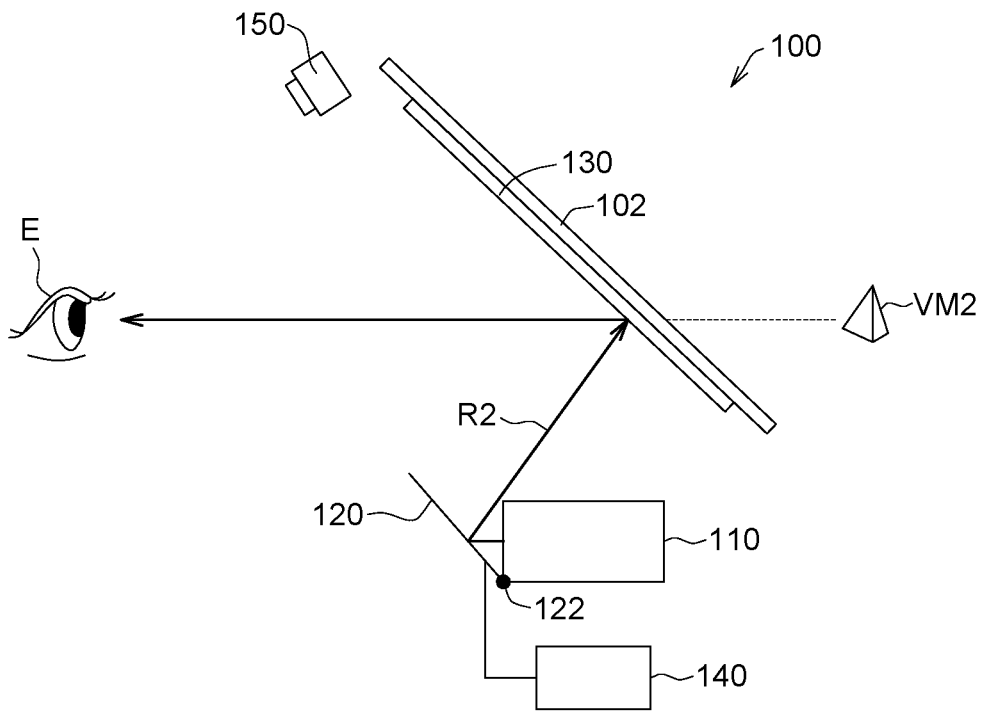
FIG. 2 is a schematic diagram of a head-up display capable of adjusting an imaging position according to a first embodiment of the present invention, wherein the reflector is located at the second position.

Referring to FIG. 1 and FIG. 2, schematic diagrams of a head-up display 100 capable of adjusting an imaging position according to a first embodiment of the present invention are respectively shown. The head-up display 100 includes an image generation module 110, a reflector 120, a holographic diffraction optical element 130 and a control unit 140. The image generation module 110 is configured to display and project an image. The reflector 120 is configured to reflect and project the image on a transparent screen 102 through the reflector 120. The holographic diffraction optical element 130, which is disposed on the transparent screen 102 and forms a pre-determined angle with the reflector 120, is configured to reflect the image to the visible range of the user's eyes E to assure that the user can view virtual part VM1 or VM2 of the image. The control unit 140 is coupled to the reflector 120 to adjust the viewing angle of the holographic diffraction optical element 130.

In an embodiment, the image generation module 110, which can be an optical machine module, a liquid crystal display or a mini LED display, is disposed on a central control platform under the transparent screen 102. The image generation module 110 is configured to project the image on the transparent screen 102, such that the virtual part VM1 or VM2 of the image is located within the visible range of the user's eyes E. In an embodiment, the transparent screen 102 can be a wind screen of a vehicle or a combiner.

In an embodiment, the reflector 120 can be formed by a rotatable reflector 120 whose one end has a shaft 122. The control unit 140 can control the rotation angle of the shaft 122 and enable the reflector 120 to move to the first position of FIG. 1 or the second position of FIG. 2 and enable the image lights R1 and R2 of specific wavelength (that is, the fluorescent wavelength of the image) to enter the holographic diffraction optical element 130 at different optical axis angles, such as the first image light R1 in FIG. 1 and the second image light R2 in FIG. 2. As indicated in FIG. 1, the first image light R1 is reflected through the reflector 120, projected on the transparent screen 102 and then reflected to the user's eyes E to assure that the user can view the virtual part VM1 of the image. As indicated in FIG. 2, when the position of the user's eyes E changes and the user's viewing angle is greater than the holographic viewing angle, the user will not be able to view the virtual part VM1 of the image of FIG. 1. Meanwhile, the control unit 140 can control the rotation angle of the shaft 122, such that the second image light R2 is reflected through the reflector 120, projected on the transparent screen 102 and then reflected to the user's eyes E to assure that the user can view the virtual part VM2 of the image. As indicated in FIG. 1 and FIG. 2, when the rotation angle of the shaft 122 changes, the imaging positions of the virtual parts VM1 and VM2 will change to different positions for the users of different heights to view.

In an embodiment, the holographic diffraction optical element 130 is disposed on the transparent screen 102 and includes a first grating structure and a second grating structure. The first grating structure has a first holographic viewing angle, the second grating structure has a second holographic viewing angle, and the first holographic viewing angle and the second holographic viewing angle are not the same. For example, the first holographic viewing angle and the second holographic viewing angle differ by a pre-determined angle (5° to 20° or more) to avoid the interference of the images. As indicated in FIG. 1, the first grating structure is adapted to the optical axis angle of the first image light R1. As indicated in FIG. 2, the second grating structure is adapted to the optical axis angle of the second image light R2.

Figure 3:
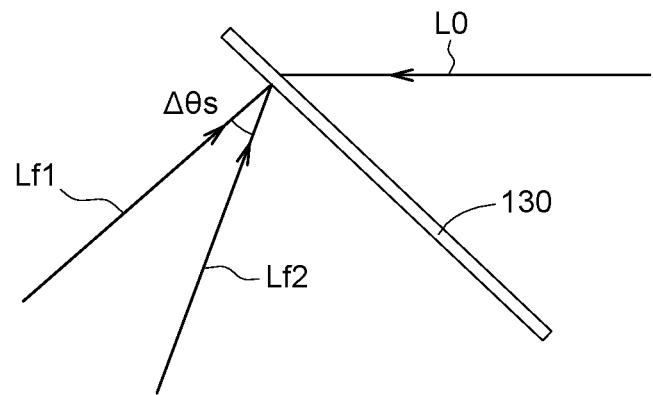
FIG. 3 is a schematic diagram of manufacturing a grating structure in a holographic diffraction optical element.

Referring to FIG. 3, a schematic diagram of manufacturing a grating structure in a holographic diffraction optical element 130 is shown. During the manufacturing process of the first grating structure of the holographic diffraction optical element 130, interference fringes generated by the first reference light Lf1 and the object light L0 are recorded on a photosensitive material and then are developed to form the first grating structure. Similarly, during the manufacturing of the second grating structure of the holographic diffraction optical element 130, interference fringes generated by the second reference light Lf2 and the object light L0 are recorded on the photosensitive material and then are developed to form the second grating structure. The reference lights are parallel light or a spherical wave, for example, and the object light L0 is parallel light or a spherical wave, for example. The first reference light Lf1 and the second reference light Lf2 form an angle difference $\Delta\theta s$, which needs to be greater than the angle selection characteristics of the holographic viewing angle adjustment mechanism to avoid generating interference between the reference lights Lf1 and Lf2. In an embodiment, the angle difference $\Delta\theta s$ between the two reference lights is greater than $\lambda/t \sin(\theta)$, wherein $\lambda$ represents the wavelength of the reference light, t represents the thickness of the holographic diffraction optical element 130, and $\theta$ represents the interference angle between the reference light and the object light L0.

During image re-construction, the first image light R1 is adjusted to have the same optical axis angle with the first reference light Lf1; or the second image light R2 is adjusted to have the same optical axis angle with the second reference light Lf2. Thus, when the first image light R1 is projected on the first grating structure, the first image light R1 can be diffracted to re-construct the original image; when the second image light R2 is projected on the second grating structure, the second image light R2 can be diffracted to re-construct the original image.

Therefore, the head-up display 100 of the present embodiment can adjust the optical axis angle of the image light projected on the holographic diffraction optical element 130 through the holographic viewing angle adjustment mechanism to diffract the image and synchronically change the viewing angle at which the user view the virtual image.

Refer to FIG. 1 and FIG. 2. The head-up display 100 of the present embodiment further includes a human eye tracking unit 150 coupled to the control unit 140. The human eye tracking unit 150 provides a human eye positioning signal to the control unit 140. The control unit 140 automatically adjusts the viewing angle of the holographic diffraction optical element 130 according to the human eye positioning signal. That is, the first holographic viewing angle and the second holographic viewing angle of the grating structure are determined according to the position of the user's eyes E when viewing the virtual part VM1 or VM2. In the absence of the human eye tracking unit 150, the user can manually control the control unit 140 (such as a regulator) to adjust the viewing angle of the holographic diffraction optical element 130. Meanwhile, the first holographic viewing angle and the second holographic viewing angle are determined according to the optical axis angle of the image projected on the holographic diffraction optical element 130 (that is, the optical axis angle of the first image light R1 and the second image light R2).

Figure 4:
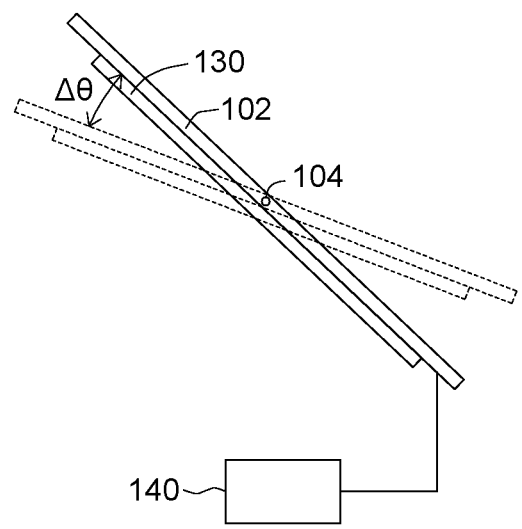
FIG. 4 is a schematic diagram of a holographic viewing angle adjustment mechanism according to another embodiment of the present invention.

Referring to FIG. 4, a schematic diagram of a holographic viewing angle adjustment mechanism according to another embodiment of the present invention is shown. In an embodiment, the transparent screen 102 can be realized by a rotatable combiner having a shaft 104. The control unit 140 (such as motor) can control the rotation angle of the shaft 104 and enable the image light of specific wavelength (that is, the fluorescent wavelength of the image) to enter the holographic diffraction optical element 130 at different optical axis angles.

The holographic diffraction optical element 130 includes a first grating structure and a second grating structure. The first grating structure has a first holographic viewing angle, and the second grating structure has a second holographic viewing angle. Detailed of the head-up display 100 of the present embodiment are the same as the above descriptions and the similarities are not repeated here. Therefore, the head-up display 100 of the present embodiment can adjust the optical axis angle of the image light projected on the holographic diffraction optical element 130 through the holographic viewing angle adjustment mechanism to diffract the image and synchronically change the viewing angle at which the user view the virtual image.

Figure 5:
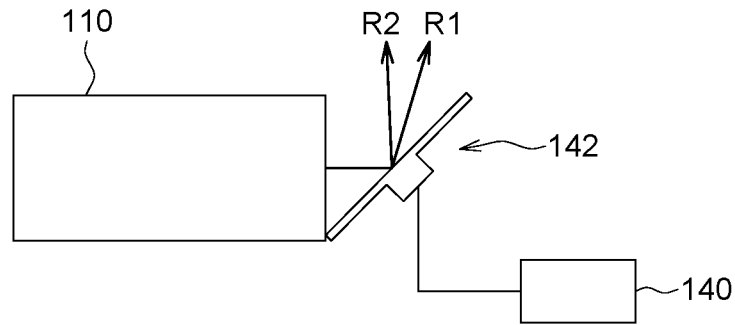
FIG. 5 and FIG. 6 respectively are schematic diagrams of a holographic viewing angle adjustment mechanism according to another embodiment of the present invention.
Figure 6:
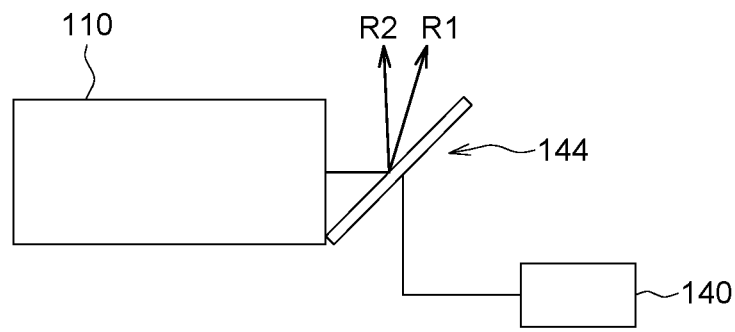

Referring to FIG. 5 and FIG. 6, schematic diagrams of a holographic viewing angle adjustment mechanism according to another embodiment of the present invention are respectively shown. Apart from adjusting the holographic viewing angle using the reflector 120 or the transparent screen 102, the reflective optical element 142 (as indicated in FIG. 5) or the spatial light modulator (SLM) 144 (as indicated in FIG. 6) can also be used to mechanically or electrically adjust the holographic viewing angle. As indicated in FIG. 5, the reflective optical element 142 can be a galvo-mirror or a micro-electromechanical systems (MEMS) scanning mirror, the reflective optical element 142 can be formed of an X-Y axis optical scanning head, an electronic drive amplifier and an optical reflector. The signal provided by the control unit 140 drives the X-Y axis optical scanning head using the electronic drive amplifier to control the deflection angle of the image light R1 or R2 on the X-Y plane. As indicated in FIG. 6, the spatial light modulator 144 can be another holographic diffraction optical element or a liquid crystal display element.

The spatial light modulator 144 can perform program control to determine the amount of change in the rotation angle and can program various angles with respect to the regions of the real image. The spatial light modulator 144 can be a reflective liquid crystal element (such as an electronically controlled silicon base liquid crystal element) or a transmissive liquid crystal element. When the spatial light modulator 144 is formed by a transmissive liquid crystal element, an additional reflector is disposed between the spatial light modulator 144 and the wind screen, and a holographic diffraction optical element is disposed on the reflector, wherein the holographic diffraction optical element, which can be an angular multiplexing Bragg grating, can project the image light R1 or R2 to the wind screen from the spatial light modulator 144. When the spatial light modulator 144 is formed by a reflective liquid crystal element, which is already equipped with the reflective function, the additional reflector is not required.

A phase aberration correction can also be programmed to the spatial light modulator 144 to perform optical fine-tuned correction to the phase aberration generated by the holographic diffraction optical element 130 at different angles. Phase aberration correction can be performed to different regions. Therefore, the head-up display 100 of the present embodiment can use the spatial light modulator 144 to correct the phase aberration generated when the holograms are read at different view angles.

Figure 7:
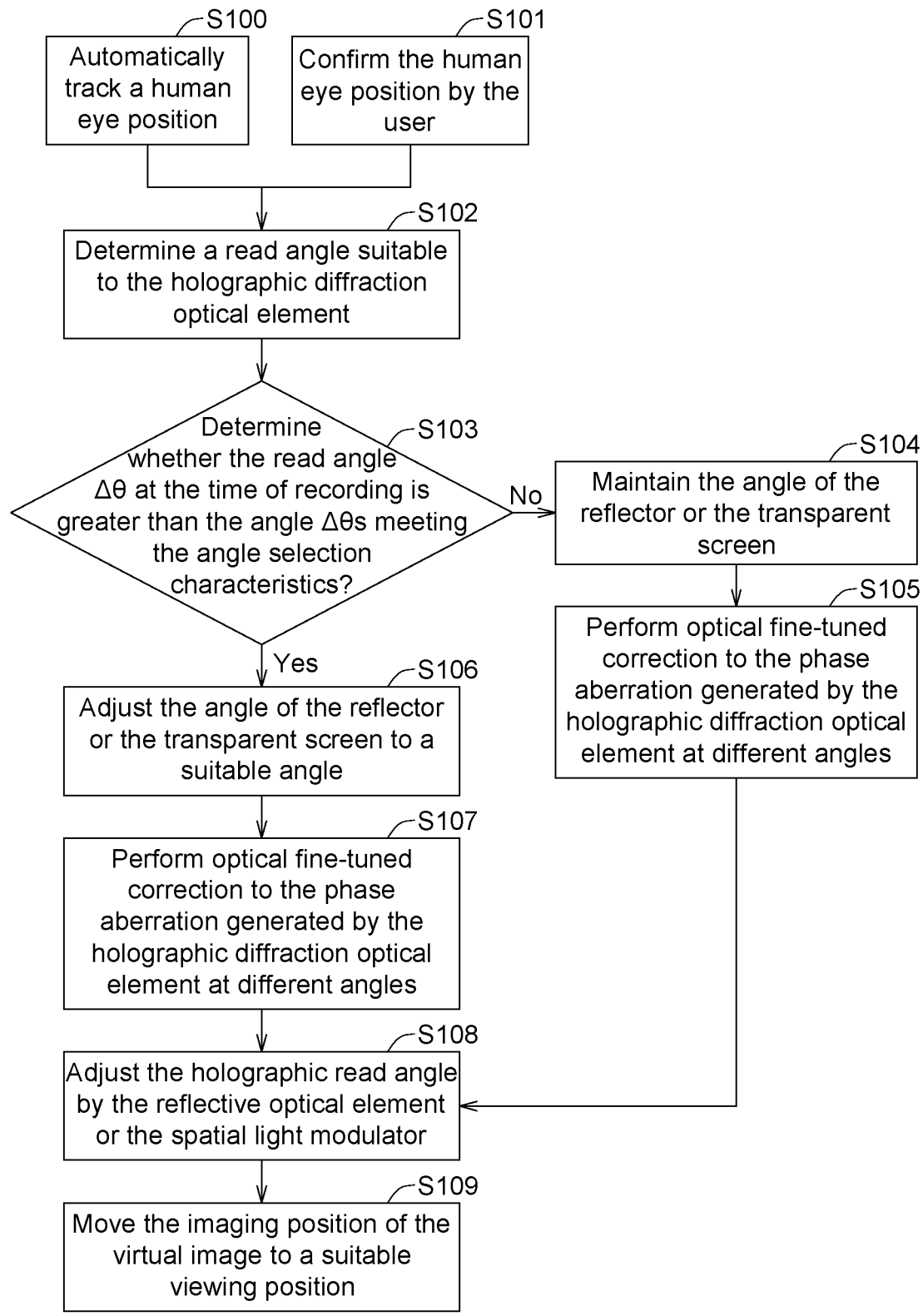
FIG. 7 is a flowchart of a judgment process of a holographic viewing angle adjustment mechanism according to an embodiment of the present invention.

Referring to FIG. 7, a flowchart of a judgment process of a holographic viewing angle adjustment mechanism according to an embodiment of the present invention is shown. In step S100, a human eye position is automatically tracked. In step S101, the human eye position is confirmed by the user. In step S102, a viewing angle suitable to the holographic diffraction optical element 130 is determined. In step S103, whether the viewing angle $\Delta\theta$ at the time of recording is greater than the angle selection characteristics is determined, that is, whether the viewing angle $\Delta\theta$ is greater than the angle difference $\Delta\theta s$ between the first reference light Lf1 and the second reference light Lf2 is determined. In step S104, if the viewing angle $\Delta\theta$ is smaller than the angle difference $\Delta\theta s$, the angle of the reflector 120 or the transparent screen 102 is maintained. In step S105, optical fine-tuned correction is performed to the phase aberration generated by the holographic diffraction optical element 130 at different angles. In step S106, if the viewing angle $\Delta\theta$ is greater than angle difference $\Delta\theta s$, the angle of the reflector 120 or the transparent screen 102 is adjusted to a suitable angle. In step S107, optical fine-tuned correction is performed to the phase aberration generated by the holographic diffraction optical element 130 at different angles. In step S108, the holographic viewing angle is adjusted by the reflective optical element 142 or the spatial light modulator 144, for example. In step S109, the imaging position of the virtual image is moved to a suitable viewing position.

The head-up display capable of adjusting an imaging position disclosed in above embodiments of the present invention avoids the inconvenience and safety of driving which occur due to the viewing angle of the conventional head-up display being unable to be adjusted to fit users of different heights. Furthermore, based on the characteristics of holographic grating and the principles of adjustable viewing angle, the head-up display capable of adjusting an imaging position disclosed in above embodiments reflects the image light of specific wavelength (that is, the fluorescent wavelength of the image) and generates a diffracted image, but allows the ambient light of other wavelength to completely penetrate the holographic diffraction optical element, such that the driver can concurrently view the image projected by the image generation module and the traffic state in front of the vehicle to realize augmented reality.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

The invention claimed is:

1. A head-up display capable of adjusting an imaging position, comprising:
   an image generation module configured to display and project an image;
   a reflector configured to reflect the image and further project the image on a transparent screen through the reflector;
   a holographic diffraction optical element disposed on the transparent screen to reflect the image to a visible range of a user; and
   a control unit coupled to the transparent screen to adjust a viewing angle of the holographic diffraction optical element having a pre-determined angle with the reflector, wherein the transparent screen comprises a shaft whose rotation angle is controlled by the control unit to change the imaging position of the image.

2. The head-up display according to claim 1, wherein the holographic diffraction optical element comprises a first grating structure and a second grating structure, the first grating structure has a first holographic viewing angle, the second grating structure has a second holographic viewing angle, and the first holographic viewing angle and the second holographic viewing angle are different.

3. The head-up display according to claim 2, wherein the first holographic viewing angle and the second holographic viewing angle are determined according to a position of the user's eyes when viewing a virtual part of the image.

4. The head-up display according to claim 2, wherein the first holographic viewing angle and the second holographic viewing angle are determined according to an optical axis angle of the image projected on the holographic diffraction optical element.

5. The head-up display according to claim 1, further comprising a human eye tracking unit coupled to the control unit to provide a human eye positioning signal to the control unit, wherein the control unit automatically adjusts the viewing angle of the holographic diffraction optical element according to the human eye positioning signal.

6. A head-up display capable of adjusting an imaging position, comprising:
   an image generation module configured to display and project an image;
   a reflector configured to reflect the image and further project the image on a transparent screen through the reflector;
   a holographic diffraction optical element disposed on the transparent screen to reflect the image to a visible range of a user; and
   a control unit coupled to the reflector to adjust a viewing angle of the holographic diffraction optical element having a pre-determined angle with the reflector, wherein the holographic diffraction optical element comprises a first grating structure and a second grating structure, the first grating structure has a first holographic viewing angle, the second grating structure has a second holographic viewing angle, and the first holographic viewing angle and the second holographic viewing angle are different.

7. The head-up display according to claim 6, wherein the first holographic viewing angle and the second holographic viewing angle are determined according to a position of the user's eyes when viewing a virtual part of the image.

8. The head-up display according to claim 6, wherein the first holographic viewing angle and the second holographic viewing angle are determined according to an optical axis angle of the image projected on the holographic diffraction optical element.

9. The head-up display according to claim 6, further comprising a human eye tracking unit coupled to the control unit to provide a human eye positioning signal to the control unit, wherein the control unit automatically adjusts the viewing angle of the holographic diffraction optical element according to the human eye positioning signal.

10. The head-up display according to claim 6, wherein the reflector is a reflective optical element comprising a galvo-mirror, an MEMS scanning mirror or a spatial light modulator.

* * * * *